(12) United States Patent
Boman et al.

(10) Patent No.: US 8,414,349 B2
(45) Date of Patent: Apr. 9, 2013

(54) REMOTELY CONTROLLED MOBILE DEVICE CONTROL SYSTEM

(75) Inventors: Michael Wesley Boman, Kent, WA (US); Gregory Allen Gallacci, Bothell, WA (US)

(73) Assignee: Nintendo Co., Ltd., Kyoto (JP)

( * ) Notice: Subject to any disclaimer, the term of this patent is extended or adjusted under 35 U.S.C. 154(b) by 28 days.

(21) Appl. No.: 13/150,383

(22) Filed: Jun. 1, 2011

(65) Prior Publication Data

US 2012/0309261 A1 Dec. 6, 2012

(51) Int. Cl.
*A63H 3/00* (2006.01)

(52) U.S. Cl.
USPC .............. 446/268; 446/175; 446/484; 463/47

(58) Field of Classification Search .................... 446/268
See application file for complete search history.

(56) References Cited

U.S. PATENT DOCUMENTS

| | | | | |
|---|---|---|---|---|
| 4,662,854 A | | 5/1987 | Fang | |
| 4,729,563 A | * | 3/1988 | Yokoi | ............... 463/31 |
| 6,254,486 B1 | | 7/2001 | Mathieu et al. | |
| 6,764,373 B1 | | 7/2004 | Osawa et al. | |
| 6,780,077 B2 | | 8/2004 | Baumgartner et al. | |
| 6,811,491 B1 | * | 11/2004 | Levenberg et al. | ............. 463/47 |
| 6,824,442 B2 | | 11/2004 | Andrews et al. | |
| 7,131,887 B2 | | 11/2006 | Hornsby et al. | |
| 7,720,572 B2 | | 5/2010 | Ziegler et al. | |
| 8,042,811 B1 | * | 10/2011 | Markowitz et al. | ....... 273/148 B |
| 8,192,285 B2 | * | 6/2012 | Cheng et al. | .................... 463/37 |
| 8,313,378 B1 | * | 11/2012 | Snyder et al. | .................. 463/36 |
| 2004/0085222 A1 | | 5/2004 | Yoshikawa | |
| 2004/0249506 A1 | | 12/2004 | Hayashi et al. | |
| 2006/0262000 A1 | | 11/2006 | Strong | |
| 2007/0052177 A1 | * | 3/2007 | Ikeda et al. | ................... 273/317 |
| 2007/0249422 A1 | | 10/2007 | Podoloff | |
| 2008/0015017 A1 | * | 1/2008 | Ashida et al. | ................... 463/37 |
| 2008/0039202 A1 | * | 2/2008 | Sawano et al. | .................. 463/39 |
| 2009/0081923 A1 | | 3/2009 | Dooley et al. | |
| 2009/0088248 A1 | * | 4/2009 | Stevens et al. | ................... 463/36 |
| 2009/0209346 A1 | * | 8/2009 | Cheng et al. | .................... 463/37 |
| 2009/0291764 A1 | | 11/2009 | Kirkman et al. | |
| 2010/0009762 A1 | * | 1/2010 | Takeda et al. | ................... 463/47 |
| 2010/0304873 A1 | * | 12/2010 | Markowitz et al. | ............. 463/47 |

FOREIGN PATENT DOCUMENTS

| | | | |
|---|---|---|---|
| JP | 2002153674 A | * | 5/2002 |
| JP | 2003210836 A | * | 7/2003 |
| JP | 2003210843 A | * | 7/2003 |

\* cited by examiner

*Primary Examiner* — Tramar Harper

(74) *Attorney, Agent, or Firm* — Nixon & Vanderhye P.C.

(57) ABSTRACT

A remotely controlled mobile device control system is disclosed wherein a remote controller of an existing game apparatus is selectively attachable to a remote controlled toy and used for controlling the movement of the remote controlled toy in conjunction with the game apparatus which is used as a central processing unit.

25 Claims, 11 Drawing Sheets

REMOTELY CONTROLLED MOBILE DEVICE CONTROL SYSTEM

TECHNICAL FIELD

The technology herein relates to an apparatus and a method for using a game console as a central processing unit and a remote controller compatible with the game console as an inertial guidance platform for controlling the motion of a remotely controlled device such as a multi-legged robot. In more detail, the technology herein relates to techniques for integrating existing game platform components with remotely controllable devices for controlling the motion of the devices.

BACKGROUND AND SUMMARY

Remote controlled toys are well known in the art. Such toys generally include a remote control device having one or more manual controls for controlling the movement of the remote controlled toy. The remote controlled toy typically includes a built-in receiver which receives control signals from the remote control device. The control signals may be communicated via a wired or wireless connection.

The subject patent application describes an example system in which a remote control device is selectively attachable to a remote controlled toy. The remote control device receives control signals from a base unit which may, for example, be a video game console. These control signals may be for controlling operations of the remote controlled toy such as moving.

In one example implementation, the remote controlled toy may be configured to use certain outputs from the remote control device in order to effect control of the toy.

For example, if the remote control device includes a speaker(s), the toy may be configured with a transducer(s) that is appropriately disposed to detect sounds output from the speaker(s) and that converts these detected sounds into electrical signals for various toy controls. A first sound may be converted into an electrical signal for forward movement. A second sound may be converted into an electrical signal for backward movement. Other sounds may be converted into electrical signals for sideways movement, stopping, etc.

If the remote control device includes one or more light emitters, the toy may be configured with a transducer(s) that is appropriately disposed to detect light emitted from the light emitters and that converts the detected light into electrical signals for various toy controls.

If the remote control device includes one or more devices that may be switched on/off, the toy may be configured with a transducer(s) that is appropriately disposed to detect magnetic fields associated with on/off switching signals sent to the remote control and that converts these detected magnetic fields into electrical signals for various toy controls.

In another example implementation, the remote control device may include a male/female connecting part that connects with a female/male connecting part of the remote controlled toy. In this way, electrical signals from the remote control may be provided to control circuitry of the toy.

The base unit may also receive information communicated from the remote control device. For example, the remote control device may include an accelerometer(s) or gyroscope(s). Accelerometer and/or gyroscope information may be communicated from the remote control device to the base unit, which can then use this information to determine aspects of position and/or orientation associated with the remote control device (and therefore also of the toy).

In another example, the remote control may include a camera(s) that captures images of the surroundings. For example, the camera may detect infrared lights that are indicative of an obstacle or that constitute a fiducual that can be used to determine aspects of position and/or orientation. The camera information can be sent to the base unit, which can then use this camera information, by itself or in combination with accelerometer and/or gyroscope information, to determine aspects of position and/or orientation.

In a certain example implementation, the base unit may be a video game console which executes a video game program that can use the camera, accelerometer and/or gyroscope information to generate signals for controlling the remote controlled toy. The signals may, for example, turn the toy on or off, cause the toy to move in a certain direction(s), cause sounds to be emitted by the toy, cause lights on the toy to turn on/off, and the like.

In one example illustrative non-limiting implementation, the remote controller of an existing game apparatus is integrated with a mobile robot and used as a guidance platform for controlling the movement of the mobile robot in conjunction with the game apparatus which is used as a central processing unit. A speaker in the remote controller utilizing audio input through a microphone is used to control servo motors in the appendages of the robot to maintain balance and affect movement. An infrared camera in the remote controller is used for target acquisition so that the moving robot can avoid obstacles. A gyro and/or accelerometer devices in the remote controller are used for detecting the movement of the mobile robot carrying the remote controller.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Overall Structure of the Game System

Figure 1:
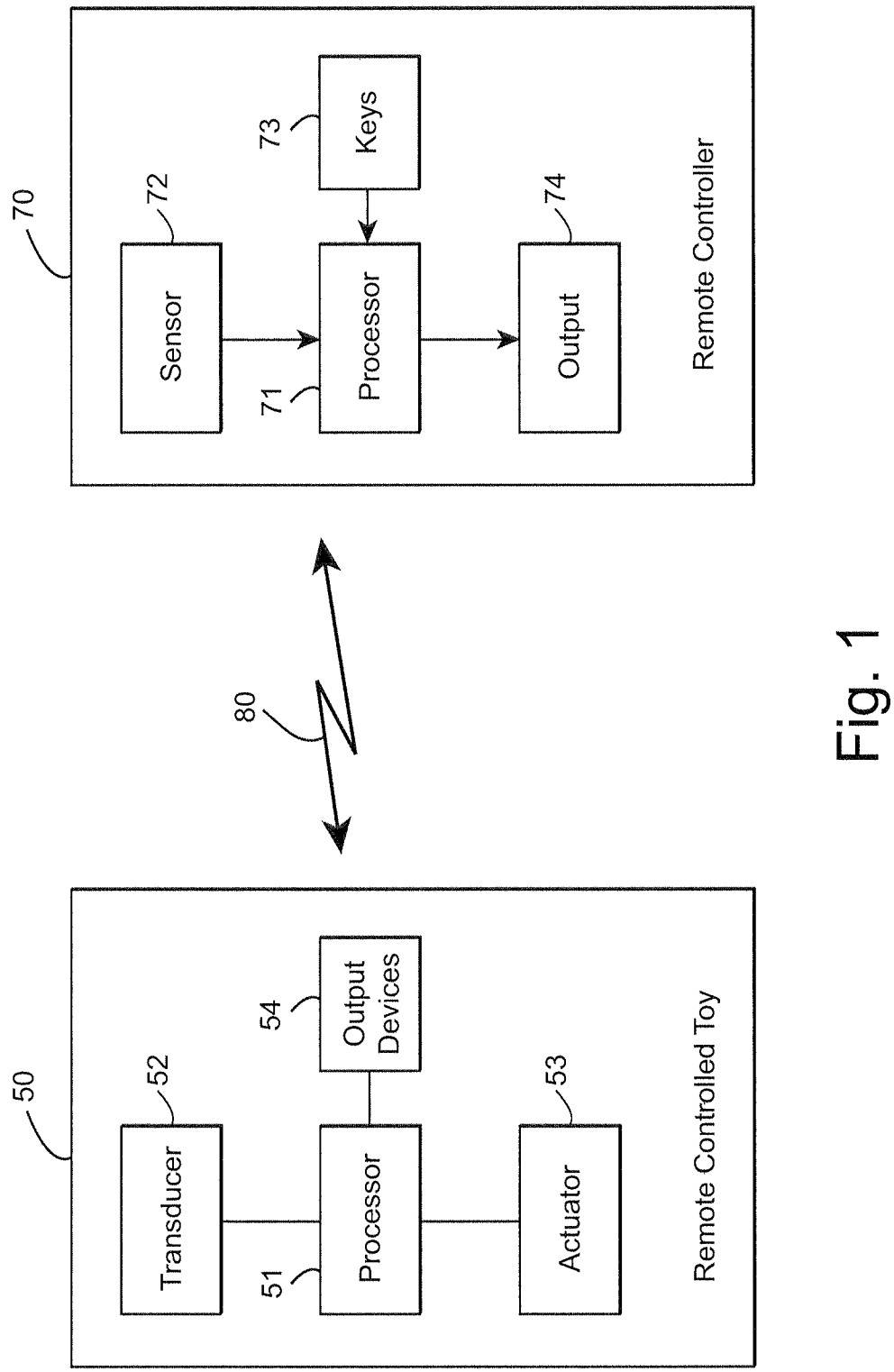
FIG. 1 schematically shows a conceptual configuration supporting a non-limiting exemplary embodiment of a remote controlled toy according to the invention.

With reference to FIG. 1, a remote controlled mobile device control system, including a remote controlled device, such as a toy, 50, and a remote controller 70 will be described. The remote controlled device 50 and the remote controller 70 are in a communication 80 with each other. The remote controller receives control signals from a base unit, which may be a video game console (not shown).

The remote controller includes a processor unit 71, sensors 72, operation keys 73 and an output unit 74. The processor 71 receives data from the operation keys 73 (when the controller is used to play a game displayed on a display), signals from the sensor(s) 72, including an accelerometer(s) as well as an imaging sensor, e.g., an infrared camera. The processor 71 temporarily stores the data in a memory as transmission data to be outputted by the output unit 74. The output unit may also output an audio signal or a vibration signal.

The remote controlled toy 50 includes a processor 51, transducers 52, actuators 53 and output devices 54. The transducers 52 receive an input signal from the remote controller 70 and convert the signal into electrical signals for various toy controls. This signal may be an audio signal, an IR signal, or a vibration signal. Actuator 53 then converts the electrical signals into mechanical motion for various sections of the robot toy, output devices 54.

The communication between the remote controller 70 and the remote controlled toy 50 may be wireless or may be via a contact between a male/female connecting part of the remote controller and a female/male connecting part of the remote controlled toy.

Figure 2:
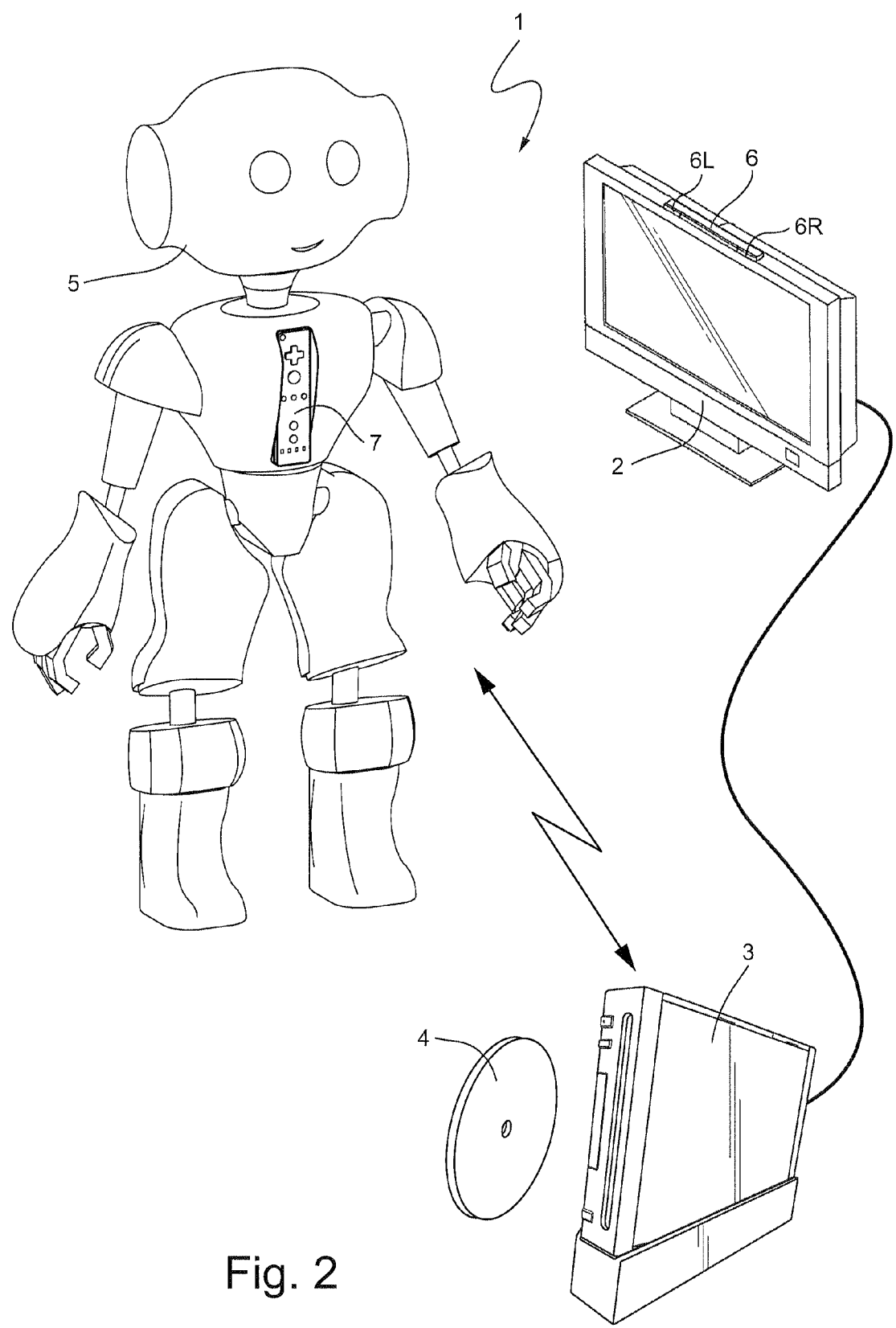
FIG. 2 schematically shows a configuration supporting a non-limiting exemplary embodiment of a remote controlled toy according to the invention.

With reference to FIG. 2, a remote controlled robot game system 1 including a game apparatus and a remote controller communicating with the game apparatus according to an example embodiment of the present invention will be described. FIG. 2 is an external view of the robot game system 1. Hereinafter, a game apparatus and the robot according to the present embodiment will be described. In the following example, the game apparatus is a stationary game apparatus. As shown in FIG. 2, the game system 1 includes a TV receiver (hereinafter referred to simply as a "TV") 2, a game apparatus 3, an optical disc 4, a marker section 6, and a controller 7. The controller 7 is removably attached into a modular slot in a mobile robot device 5. The mobile robot 5 is controlled using the game apparatus 3 based on operations performed using the controller 7.

In the game apparatus 3, the optical disc 4 is detachably mountable as an information storage medium exchangeably usable for the game apparatus 3. The optical disc 4 has stored therein the game program to be executed by the game apparatus 3. The game apparatus 3 has an insertion opening on the front surface thereof for mounting the optical disc 4. The game apparatus 3 reads and executes the game program stored in the optical disc 4 inserted into the insertion opening, and thus performs the game processing.

The game apparatus 3 is connected to the TV 2 as an exemplary display device via a connection cord. The TV 2 displays a game image obtained as a result of the game processing executed by the game apparatus 3. Further, the marker section 6 is provided in the vicinity of a display screen of the TV 2 (above the display screen in FIG. 1). The marker section 6 includes two markers 6R and 6L respectively at two ends thereof. Specifically, the marker 6R (also the marker 6L) includes one or more infrared LEDs, and outputs infrared light forward from the TV 2. The marker section 6 is connected to the game apparatus 3, and the game apparatus 3 can control each of the infrared LEDs included in the marker section 6 to be lit up or out.

The controller 7 is an input device for providing the game apparatus 3 with operation data representing the particulars of the operation made thereon or with particulars about the position of the robot 5. The controller 7 and the game apparatus 3 are connected to each other via wireless communication. In the present embodiment, the controller 7 and the game apparatus 3 wirelessly communicate with each other by, for example, the Bluetooth (registered trademark) technology. Note that in another embodiment, the controller 7 and the game apparatus 3 may be connected to each other in a wired manner.

(Internal Structure of the Game Apparatus 3)

Figure 3:
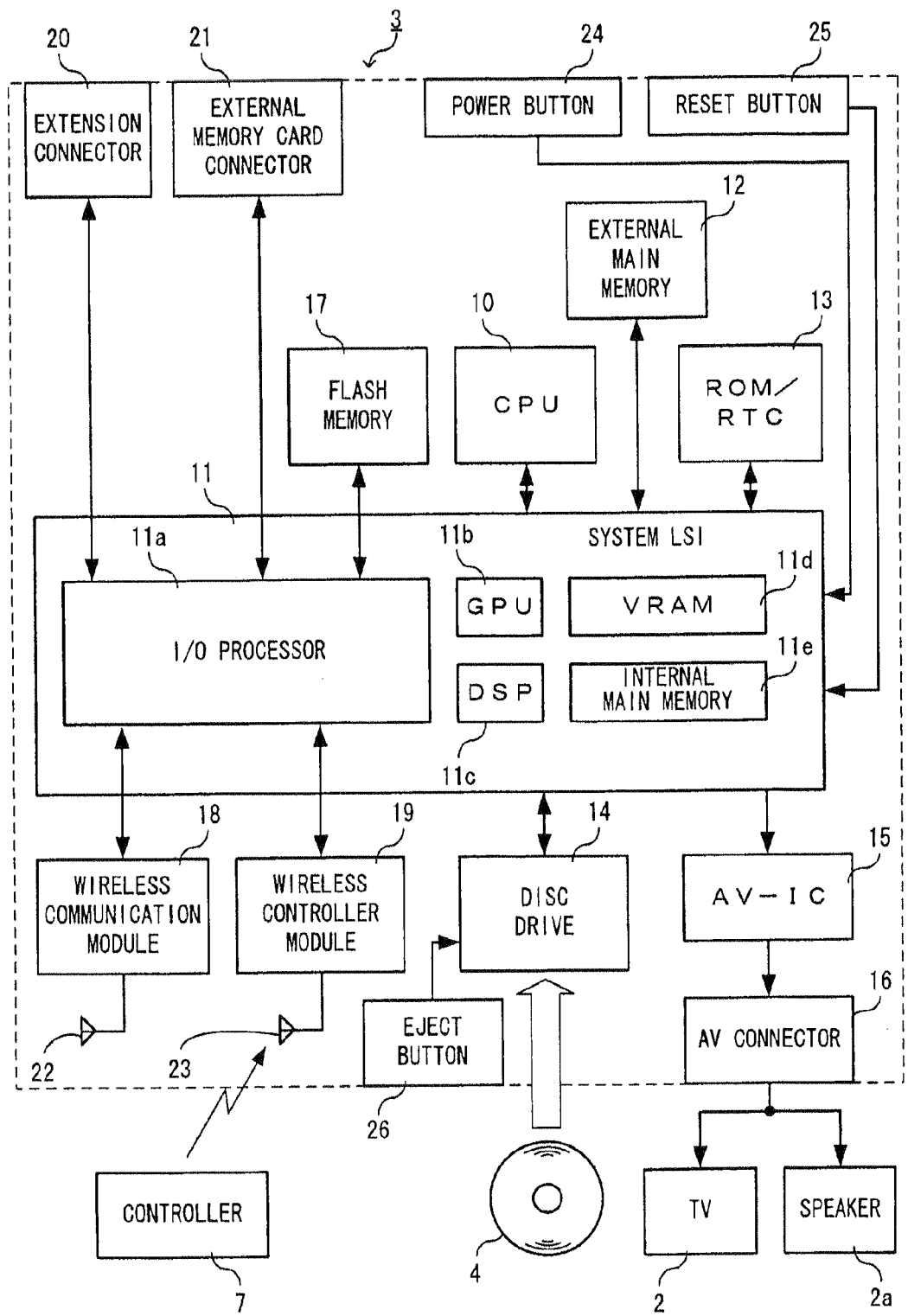
FIG. 3 is a block diagram showing a structure of a game apparatus 3.

Next, with reference to FIG. 3, an internal structure of the game apparatus 3 will be described. FIG. 3 is a block diagram showing a structure of the game apparatus 3. The game apparatus 3 includes a CPU 10, a system LSI 11, an external main memory 12, a ROM/RTC 13, a disc drive 14, an AV-IC 15, and the like.

The CPU 10 performs the game processing by executing the game program stored in the optical disc 4, and acts as a game processor. In addition, the CPU 10 performs the processing related to the robot 5. The CPU 10 is connected to the system LSI 11. The system LSI 11 is connected to the CPU 10 and also to the external main memory 12, the ROM/RTC 13, the disc drive 14, and the AV-IC 15. The system LSI 11, for example, controls data transfer between the elements connected thereto, generates images to be displayed, and obtains data from external devices. An internal structure of the system LSI 11 will be described below. The external main memory 12, which is of a volatile type, stores therein programs including the game program read from the optical disc 4, the game program read from a flash memory 17, or various other data. The external main memory 12 is used as a work area or a buffer area of the CPU 10. The ROM/RTC 13 includes a ROM (a so-called boot ROM) having a program for starting the game apparatus 3 incorporated therein and a clock circuit (RTC: Real Time Clock) for counting time. The disc drive 14 reads program data, texture data or the like from the optical disc 4 and writes the read data into an internal main memory 11e described below or the external main memory 12.

The system LSI 11 includes an input/output processor (I/O processor) 11a, a GPU (Graphics Processor Unit) 11b, a DSP (Digital Signal Processor) 11c, a VRAM 11d, and the internal main memory 11e. Although not shown, these elements 11a through 11e are connected to one another via an internal bus.

The GPU 11b is a part of drawing programmed logic circuitry and generates an image in accordance with a graphics command (a command to draw an image) from the CPU 10. The VRAM 11d stores data (polygon data, texture data, etc.) necessary for the GPU 11b to execute the graphics command. The GPU 11b uses the data stored in the VRAM 11d to generate image data.

The DSP 11c acts as an audio processor and generates audio data using sound data or sound wave (sound tone) data stored in the internal main memory 11e or the external main memory 12.

The image data and the audio data generated as described above are read by the AV-IC 15. The AV-IC 15 outputs the read image data to the TV 2 via an AV connector 16, and also outputs the read audio data to a speaker 2a built in the TV 2. Thus, the image is displayed on the TV 2 and also the sound is outputted from the speaker 2a.

The input/output processor 11a transmits or receives data to or from the elements connected thereto, or downloads data from external devices. The input/output processor 11a is connected to the flash memory 17, a wireless communication module 18, a wireless controller module 19, an expansion connector 20, and an external memory card connector 21. The wireless communication module 18 is connected to an antenna 22, and the wireless controller module 19 is connected to an antenna 23.

The input/output processor 11a is connected to a network via the wireless communication module 18 and the antenna 22, and thus can communicate with other game apparatuses or various servers also connected to the network. The input/output processor 11a periodically accesses the flash memory 17, and detects the presence or absence of data required to be transmitted to the network. When the data is present, the input/output processor 11a transmits the data to the network via the wireless communication module 18 and the antenna 22. The input/output processor 11a also receives, via the network, the antenna 22, and the wireless communication module 18, data transmitted from other game apparatuses or data downloaded from a download server, and stores the received data in the flash memory 17. The CPU 10 executes the game program and thus reads the data stored in the flash memory 17 to be used for the game program. The flash memory 17 may have stored therein data (data after or in the middle of the game) saved as a result of playing the game using the game apparatus 3 as well as the data to be transmitted to, or the data received from, the other game apparatuses or various servers.

Further, the input/output processor 11a receives, via the antenna 23 and the wireless controller module 19, operation data transmitted from the controller 7, and stores (temporarily stores) the operation data in a buffer area of the internal main memory 11e or the external main memory 12.

Furthermore, the input/output processor 11a is connected to the expansion connector 20 and the external memory card connector 21. The expansion connector 20 is a connector for an interface such as USB or SCSI. The expansion connector 20 may be connected to a medium such as an external storage medium, may be connected to a peripheral device such as another controller, or may be connected to a wired communication connector, so as to communicate with the network instead of the wireless communication module 18. The external memory card connector 21 is a connector for an external storage medium such as a memory card. For example, the input/output processor 11a can access an external storage medium via the expansion connector 20 or the external memory card connector 21 so as to store or read data.

The game apparatus 3 has a power button 24, a reset button 25, and an eject button 26. The power button 24 and the reset button 25 are connected to the system LSI 11. When the power button 24 is turned on, the elements of the game apparatus 3 are provided with power via an AC adaptor (not shown). When the reset button 25 is pressed, the system LSI 11 restarts a starting program of the game apparatus 3. The eject button 26 is connected to the disc drive 14. When the eject button 26 is pressed, the optical disc 4 is dismounted from the disc drive 14.

(Structure of the Controller 7)

Figure 4:
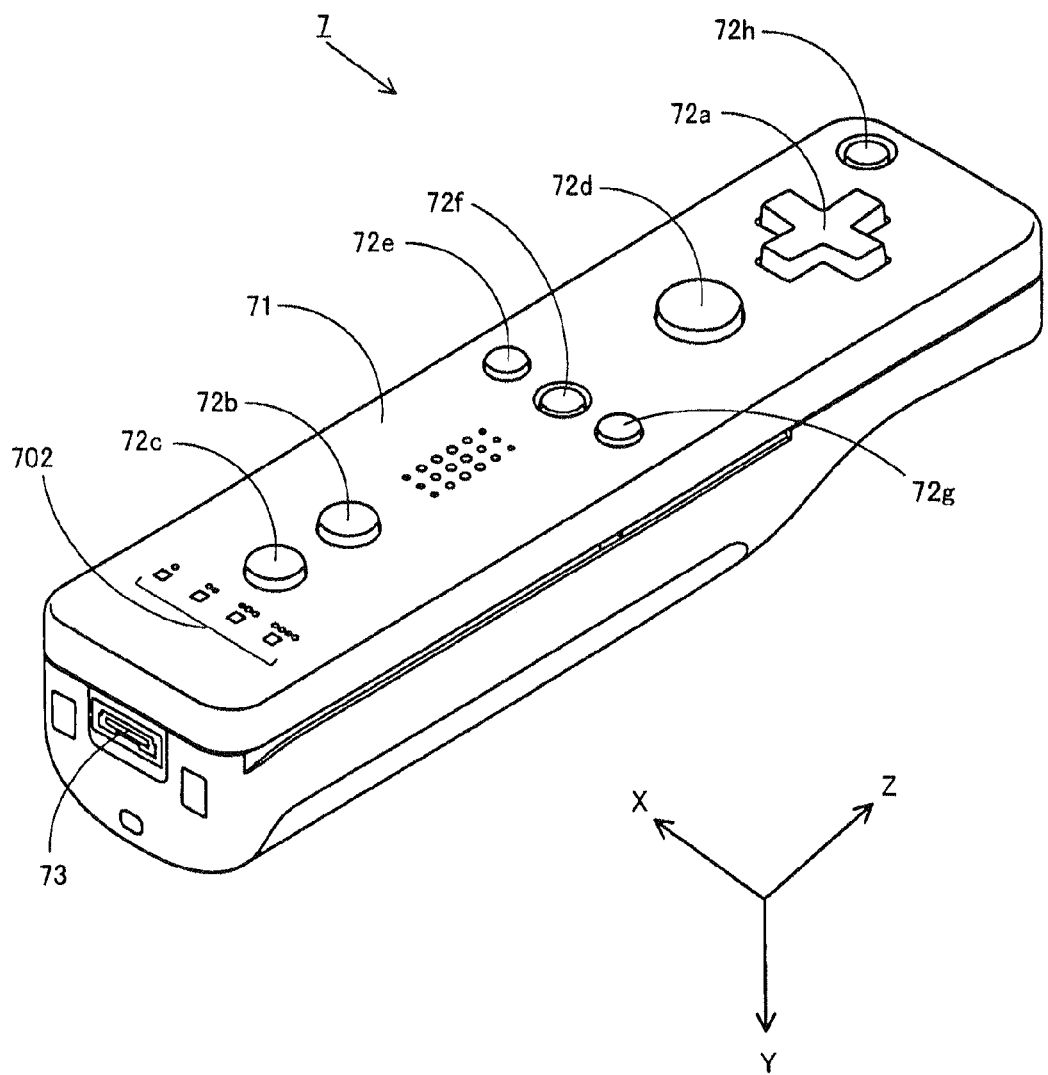
FIG. 4 is a perspective view showing a controller 7 as viewed from the top rear side thereof.
Figure 5:
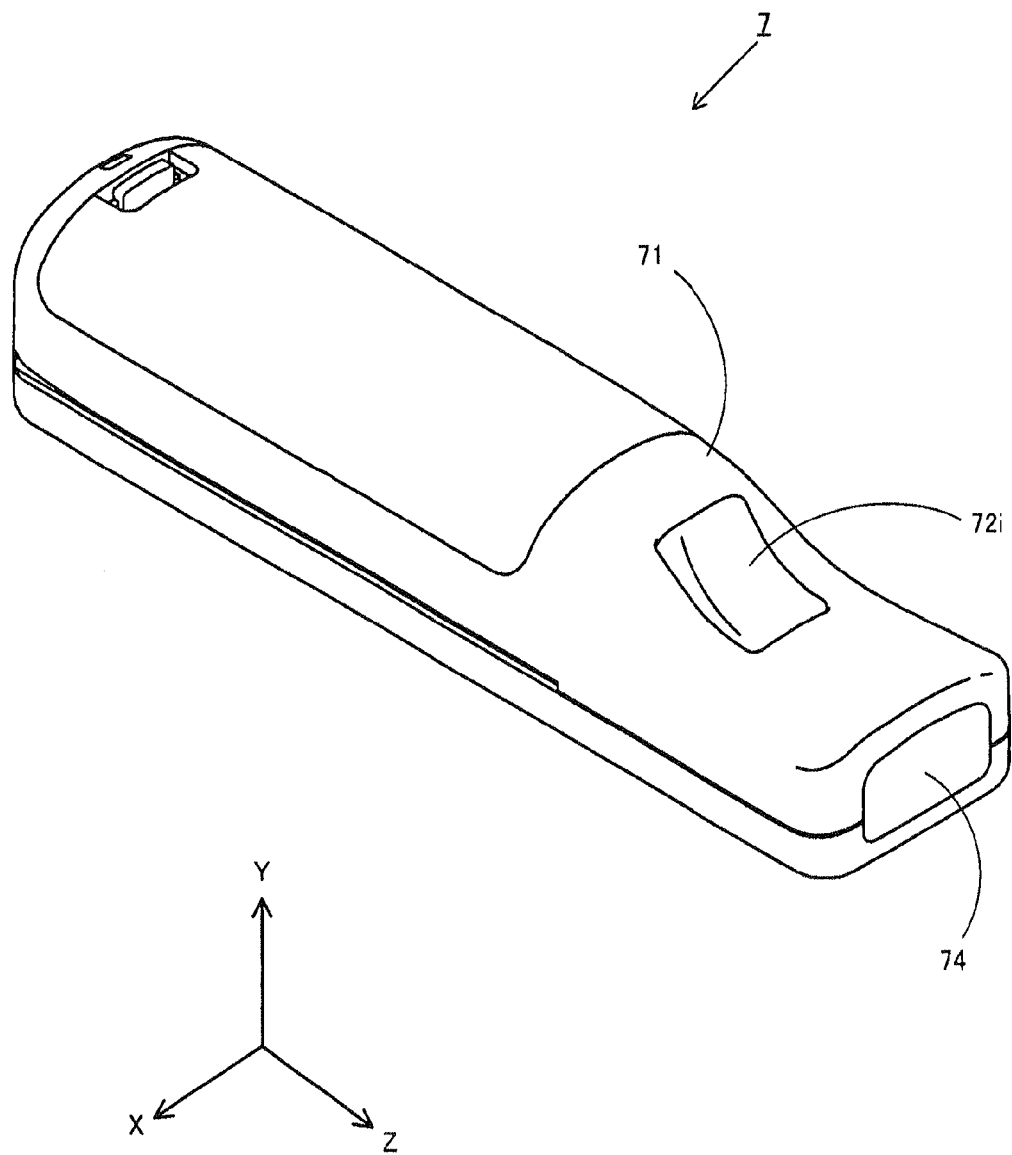
FIG. 5 is a perspective view showing the controller 7 as viewed from the bottom front side thereof.

With reference to FIGS. 4 and 5, the controller 7 will be described. Note that FIG. 4 is a perspective view showing the controller 7 as viewed from the top rear side thereof. FIG. 5 is a perspective view showing the controller 7 as viewed from the bottom front side thereof.

As shown in FIGS. 4 and 5, the controller 7 includes a housing 71 formed by plastic molding or the like. The housing 71 has a plurality of operation sections 72. The housing 71 has a generally parallelepiped shape extending in a longitudinal direction from front to rear. The overall size of the housing 71 is small enough to be held by one hand of an adult or even a child.

At the center of the front part of the top surface of the housing 71, a cross key 72a is provided. The cross key 72a is a cross-shaped four-direction push switch. The cross key 72a includes operation portions corresponding to the four directions (front, rear, right and left), which are respectively located on cross-shaped projecting portions arranged at 90 degree intervals. The player selects one of the front, rear, right, and left directions by pressing one of the operation portions of the cross key 72a. Through an operation on the cross key 72a, the player can, for example, instruct a direction in which a player character or the like appearing in a virtual game world is to move, or select one of a plurality of options.

Note that although the cross key 72a is an operation section for outputting an operation signal in accordance with the above-described direction input operation performed by the player, such an operation section may be provided in another form. For example, the cross key 72a may be replaced with an operation section which has four push switches extending in four directions, respectively, so as to form a cross and outputs an operation signal in accordance with the player pressing one of the push switches. Further, the cross key 72a may be replaced with an operation section which has the four push switches in combination with a center switch positioned at the center of the cross of the four push switches. Alternatively, the cross key 72a may be replaced with an operation section which includes an inclinable stick (a so-called joy stick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b, 72c, 72d, 72e, 72f, and 72g are provided. The operation buttons 72b, 72c, 72d, 72e, 72f, and 72g are operation sections for outputting, when the player presses the heads thereof, operation signals assigned to the operation buttons 72b, 72c, 72d, 72e, 72f, or 72g, respectively. For example, the operation buttons 72b, 72c, and 72d are assigned with functions of a first button, a second button, and an A button, respectively. Further, for example, the operation buttons 72e, 72f, and 72g are assigned with functions of a minus button, a home button, and a plus button, respectively. The operation buttons 72a, 72b, 72c, 72d, 72e, 72f, and 72g are assigned with various operation functions in accordance with the game program executed by the game apparatus 3. Note that in an exemplary arrangement shown in FIG. 4, the operation buttons 72b, 72c, and 72d are arranged in a line at the center on the top surface of the housing 71 in the front-rear direction. Further, the operation buttons 72e, 72f, and 72g are arranged in a line in the left-right direction between the operation buttons 72b and 72d on the top surface of the housing 71. The operation button 72f has the top surface thereof buried in the top surface of the housing 71, so as not to be inadvertently pressed by the player.

Further, in front of the cross key 72a on the top surface of the housing 71, an operation button 72h is provided. The operation button 72h is a power switch for remote-controlling the power of the game apparatus 3 to be on/off. The operation button 72h also has the top surface thereof buried in the top surface of the housing 71, so as not to be inadvertently pressed by the player.

Further, behind the operation button 72c on the top surface of the housing 71, a plurality of LEDs 702 are provided. The controller 7 is assigned with a controller type (number) so as to be distinguishable from the other controllers 7. For example, the LEDs 702 are used for informing the player of the controller type currently set to controller 7 that he or she is using. Specifically, when transmission data is transmitted from the controller 7 to the wireless controller module 19, one LED among the plurality of LEDs 702 which corresponds to the controller type is lit up.

Further, on the top surface of the housing 71, a sound hole for outputting, to the outside, a sound from a speaker (a speaker 706 shown in FIG. 6) described below is provided between the operation button 72b and the operation buttons 72e, 72f and 72g.

On the other hand, on the bottom surface of the housing 71, a recessed portion is formed. The recessed portion is formed at a position at which an index finger or a middle finger of the player is to be located when the player holds the controller 7 by one hand so as to orient the front surface of the controller 7 toward the markers 6L and 6R. On a slope surface (on the rear surface side) of the recessed portion, an operation button 72i is provided. The operation button 72i is an operation section acting as, for example, a B button.

Further, on the front surface of the housing 71, an image pickup element 743 included in an imaging information calculation section 74 is provided. The imaging information calculation section 74 is a system for analyzing image data taken by the controller 7 and determining an area having a high brightness in the image data, so as to detect the position of the center of gravity, the size, and the like of the area. The imaging information calculation section 74 has, for example, a maximum sampling period of about 200 frames/sec., and thus can trace and analyze even a relatively fast motion of the controller 7. The imaging information calculation section 74 will be described in detail below. Further, on the rear surface of the housing 71, the connector 73 is provided. The connector 73 is, for example, an edge connector, and is used for engaging and connecting with a connecting cable, for example.

Here, to make the following description specific, a coordinate system to be set for the controller 7 is defined. As shown in FIGS. 4 and 5, an X-axis, a Y-axis, and a Z-axis, which are orthogonal to one another, are defined for the controller 7. Specifically, the longitudinal direction of the housing 71 corresponding to the front-rear direction of the controller 7 is defined as a Z-axis direction, and a direction toward the front surface (a surface on which the imaging information calculation section 74 is mounted) of the controller 7 is defined as a Z-axis positive direction. Further, the up-down direction of the controller 7 is defined as a Y-axis direction, and a direction toward the bottom surface (a surface on which the operation button 72i is provided) of the housing 71 is defined as a Y-axis positive direction. Furthermore, the left-right direction of the controller 7 is defined as an X-axis direction, and a direction toward the left side surface (a side surface not shown in FIG. 4 but shown in FIG. 6) of the housing 71 is defined as an X-axis positive direction.

Figure 6:
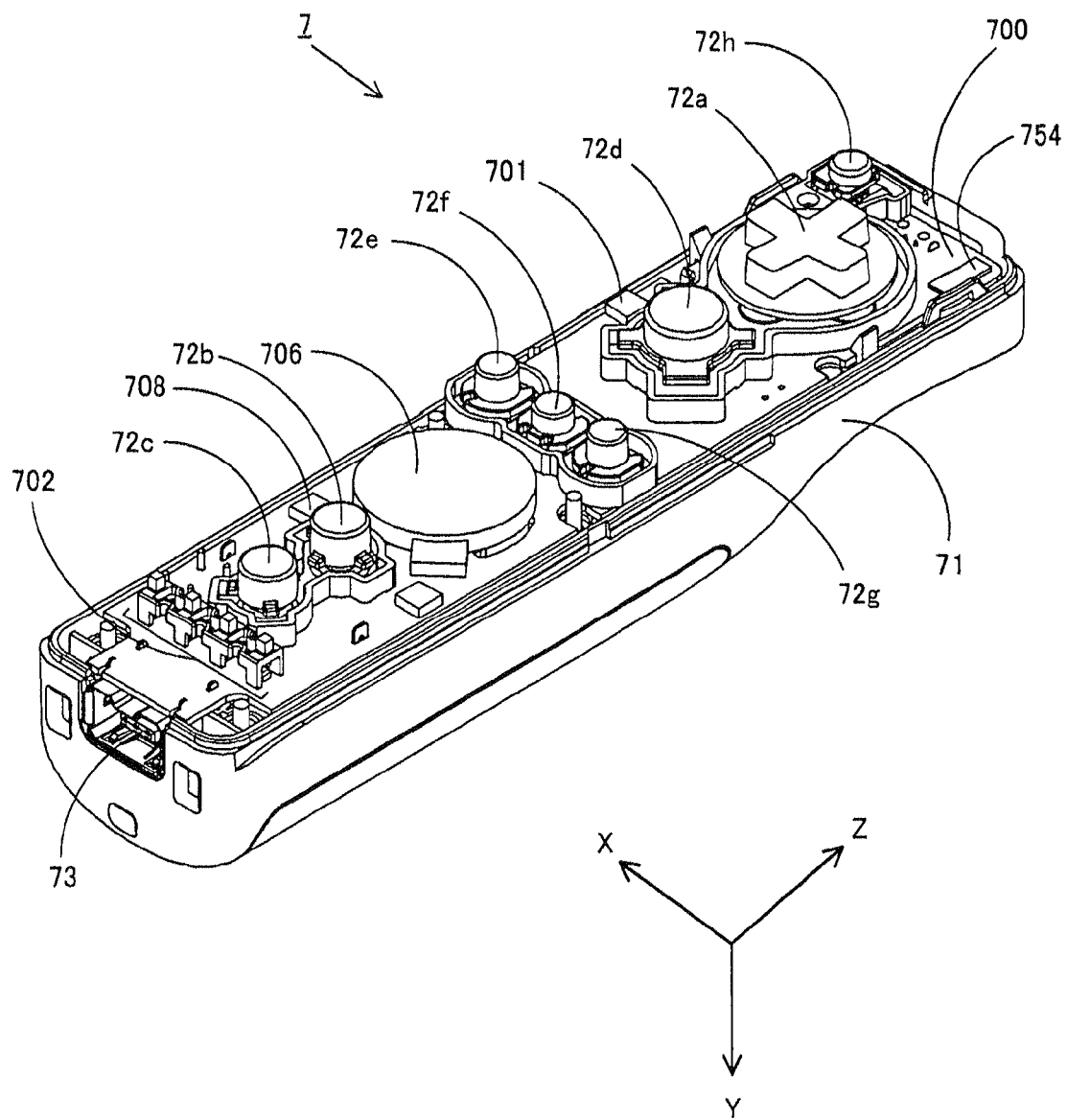
FIG. 6 is a perspective view showing a state where an upper casing of the controller 7 is removed.
Figure 7:
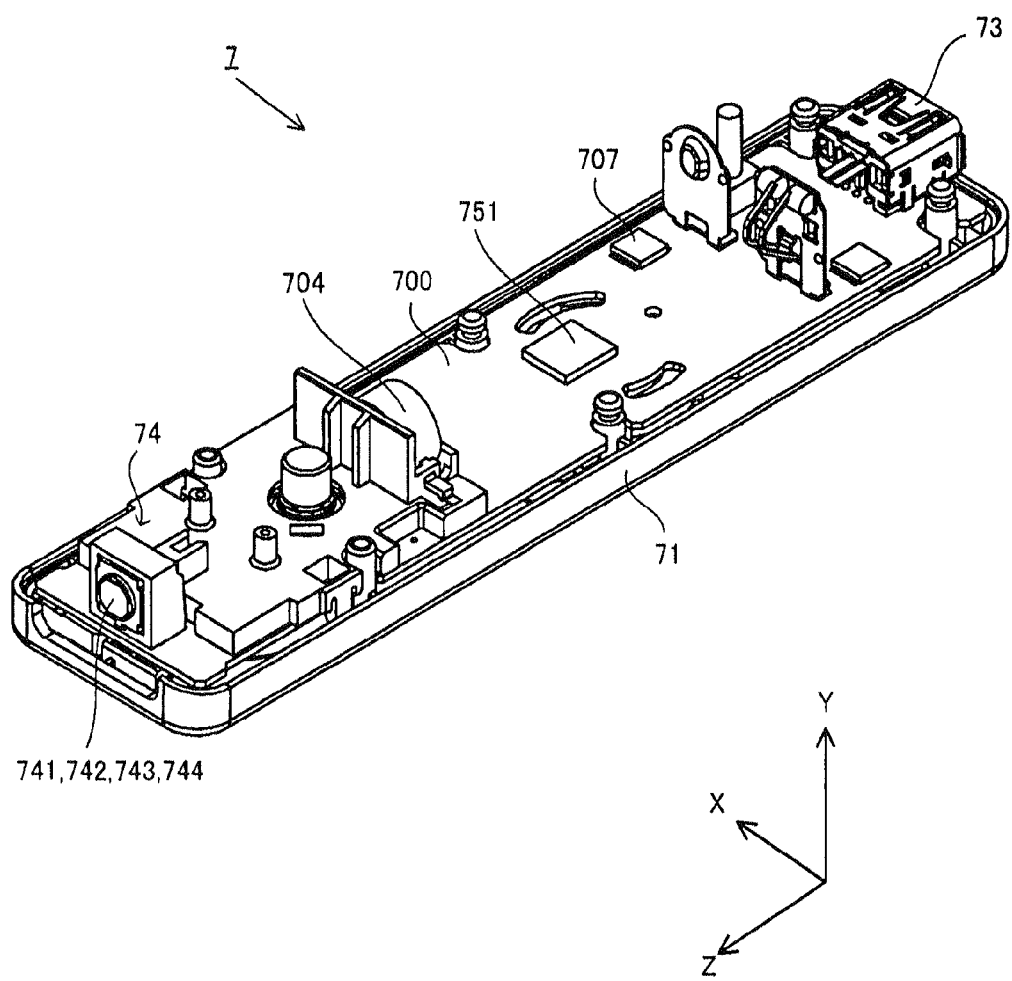
FIG. 7 is a perspective view showing a state where a lower casing of the controller 7 is removed.

Next, with reference to FIGS. 6 and 7, an internal structure of the controller 7 will be described. Note that FIG. 6 is a perspective view showing, as viewed from the top rear surface of the controller 7, a state where an upper casing (a part of the housing 71) of the controller 7 is removed. FIG. 7 is a perspective view showing, as viewed from the bottom front surface of the controller 7, a state where a lower casing (a part of the housing 71) of the controller 7 is removed. FIG. 7 is a perspective view showing the reverse side of a substrate 700 shown in FIG. 6.

As shown in FIG. 6, the substrate 700 is fixed inside the housing 71. On the top main surface of the substrate 700, the operation buttons 72a, 72b, 72c, 72d, 72e, 72f, 72g and 72h, an acceleration sensor 701, the LEDs 702, an antenna 754, and the like are provided. These elements are connected to a microcomputer 751 (see FIGS. 7 and 8) and the like via lines (not shown) formed on the substrate 700 and the like. Further, a wireless module 753 (see FIG. 8) and the antenna 754 allow the controller 7 to act as a wireless controller. Note that a quartz oscillator 703 (not shown), which is provided within the housing 71, generates a reference clock of the microcomputer 751 described below. On the top main surface of the substrate 700, the speaker 706 and an amplifier 708 are provided. Furthermore, the acceleration sensor 701 is provided on the substrate 700 to the left of the operation button 72d (i.e., provided not at the center portion of the substrate 700 but near the periphery of the substrate 700). Accordingly, the acceleration sensor 701 is, in accordance with the controller 7 rotating about the longitudinal direction thereof, capable of detecting acceleration containing a component exerted due to the centrifugal force, as well as detecting a directional change of gravity acceleration. Therefore, the game apparatus 3 and the like can perform a predetermined calculation so as to determine rotation of the controller 7 with sufficient accuracy based on the detected acceleration data.

On the other hand, as shown in FIG. 7, at the front edge of the bottom main surface of the substrate 700, the imaging information calculation section 74 is provided. The imaging information calculation section 74 includes an infrared filter 741, a lens 742, the image pickup element 743, and an image processing circuit 744 located on the bottom main surface of the substrate 700 in order, respectively, from the front surface of the controller 7. At the rear edge of the bottom main surface of the substrate 700, the connector 73 is attached. Further, on the bottom main surface of the substrate 700, a sound IC 707 and the microcomputer 751 are provided. The sound IC 707, connected to the microcomputer 751 and the amplifier 708 via the line formed on the substrate 700 and the like, outputs a sound signal to the speaker 706 via the amplifier 708 in accordance with the sound data transmitted from the game apparatus 3.

On the bottom main surface of the substrate 700, a vibrator 704 is attached. The vibrator 704 may be, for example, a vibration motor or a solenoid. The vibrator 704, connected to the microcomputer 751 via the line formed on the substrate 700 and the like, is powered on/off in accordance with vibration data transmitted from the game apparatus 3. The controller 7 is vibrated by an actuation of the vibrator 704, and the vibration is conveyed to the player's hand holding the controller 7. Thus, a so-called vibration-feedback game can be realized. The vibrator 704 is provided near the front part of the housing 71, and therefore a large vibration of the housing 71 allows the player holding the controller 7 to easily feel the vibration.

Next, with reference to FIG. 8, an internal structure of the controller 7 will be described. Note that FIG. 8 is a block diagram showing a structure of the controller 7.

Figure 8:
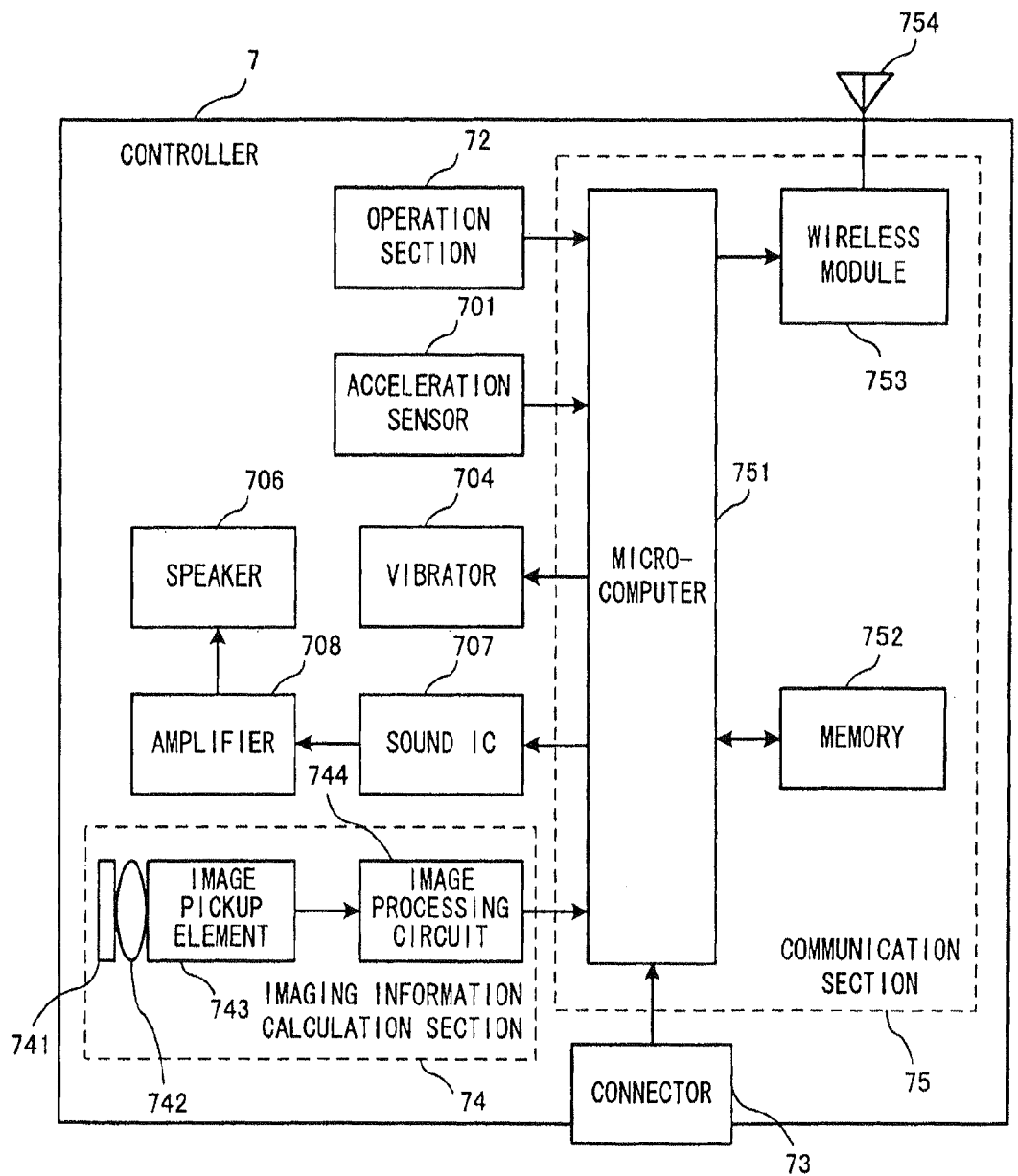
FIG. 8 is a block diagram showing a structure of the controller 7.

As shown in FIG. 8 the controller 7 includes a communication section 75, in addition to the operation sections 72, the imaging information calculation section 74, the acceleration sensor 701, the vibrator 704, the speaker 706, the sound IC 707, and the amplifier 708 as described above.

The imaging information calculation section 74 includes the infrared filter 741, the lens 742, the image pickup element 743, and the image processing circuit 744. The infrared filter 741 allows only infrared light to pass therethrough, among light incident on the front surface of the controller 7. The lens 742 collects the infrared light which has passed through the infrared filter 741, so as to output the infrared light to the image pickup element 743. The image pickup element 743 is a solid-state image pickup device such as a CMOS sensor or a CCD. The image pickup element 743 takes an image of the infrared light collected by the lens 742. Accordingly, the image pickup element 743 takes an image of only the infrared light which has passed through the infrared filter 741, so as to generate image data. The image data generated by the image pickup element 743 is processed by the image processing circuit 744. Specifically, the image processing circuit 744 processes the image data obtained by the image pickup element 743, senses an area thereof having a high brightness, and outputs the process result data, which represents the detected position coordinates and size of the area, to the communication section 75. Note that the imaging information calculation section 74 is fixed to the housing 71 of the controller 7, and therefore the imaging direction of the imaging information calculation section 74 can be changed by changing the direction of the housing 71.

The controller 7 preferably includes a three-axial (X-axis, Y-axis, and Z-axis) acceleration sensor 701. The three-axial acceleration sensor 701 senses linear acceleration in three directions, that is, the up-down direction (the Y-axis shown in FIG. 4), the left-right direction (the X-axis shown in FIG. 4), and the front-rear direction (the Z-axis shown in FIG. 4). Alternatively, in another embodiment, a two-axial acceleration detector for sensing linear acceleration along only the X-axis and the Y-axis (or a pair of other axes) may be used depending on a type of a control signal used for the game processing. Still alternatively, in yet another embodiment, one-axial acceleration detector for sensing linear acceleration along only one of the X-axis, the Y-axis, and the Z-axis may be used depending on a type of a control signal used for the game processing. For example, the three-axial, the two-axial, and the one-axial acceleration sensors 701 as described above may be of the type available from Analog Devices, Inc. or STMicroelectronics N.V. Preferably, the acceleration sensor 701 is an electrostatic capacitance (capacitance-coupling) type that is based on silicon micro-machined MEMS (Micro Electro Mechanical Systems) technology. However, any other suitable technology of acceleration detector (e.g., piezoelectric type or piezoresistance type) now existing or later developed may be used to provide the three-axial, the two-axial, and the one-axial acceleration sensors 701.

The acceleration detector as used in the acceleration sensor 701 is only capable of sensing acceleration (linear acceleration) along a straight line corresponding to each axis of the acceleration sensor 701. In other words, direct output from the acceleration sensor 701 is limited to signals each indicating the linear acceleration (static or dynamic) along the one axis, the two axes, and the three axes thereof. As a result, the acceleration sensor 701 cannot directly sense physical characteristics such as a movement along a non-linear (e.g., arcuate) path, rotation, a rotational movement, an angular displacement, a tilt, a position, or a posture.

However, by performing an additional process for acceleration signals outputted from the acceleration sensor 701, additional information relating to the controller 7 can be estimated or calculated (determined), as those skilled in the art will readily understand from the description herein. For example, when static acceleration (gravity acceleration) is sensed, it is possible to determine the tilt of an object (the controller 7) indicated by a gravity vector, by performing, based on output from the acceleration 701, a calculation using a tilt angle and the sensed acceleration. Thus, when the acceleration sensor 701 is used in combination with the microcomputer 751 (or another processor such as the CPU 10 included in the game apparatus 3), it is possible to determine the tilt, the posture, or the position of the controller 7. Similarly, when the controller 7 including the acceleration sensor 701 is moved by being dynamically accelerated with the player's hand, or when the robot is moving, it is possible to calculate various movements and/or positions of the controller 7 by processing the acceleration signals generated by the acceleration sensor 701. In another embodiment, the acceleration sensor 701 may include an embedded signal processor or another type of dedicated processor for performing any desired processing of the acceleration signals outputted from built-in acceleration detector prior to outputting signals to the microcomputer 751. For example, when the acceleration sensor 701 is intended to detect static acceleration (e.g., gravity acceleration), the embedded or dedicated processor may convert a sensed acceleration signal into a corresponding tilt angle (or another preferable parameter). Data representing the acceleration respectively sensed by the acceleration sensor 701 is outputted to the communication section 75.

In another embodiment, as an acceleration sensor for detecting a movement of the controller 7, a gyro-sensor having built therein a rotation element, a vibration element, or the like may be employed. An exemplary MEMS gyro-sensor used in the present embodiment is available from Analog Devices, Inc. Unlike the acceleration sensor 701, the gyro-sensor can directly sense a rotation (or an angular velocity) about an axis of at least one gyro-element included therein. Thus, since the gyro-sensor and the acceleration sensor are basically different from each other, one of these devices is selected depending on the individual application, and accordingly, processes performed for output signals from these devices are required to be changed as appropriate.

Specifically, when a tilt or a posture is calculated using the gyro-sensor instead of the acceleration sensor, a significant change is required. That is, when the gyro-sensor is used, the value of the tilt is initialized at the start of detection. Thereafter, angular acceleration data outputted from the gyro-sensor is integrated. Next, the amount of change in tilt is calculated from the initialized tilt value. In this case, the calculated tilt has a value corresponding to an angle. On the other hand, when a tilt is calculated using the acceleration sensor, the tilt is calculated by comparing to a predetermined reference the value of a component of gravitational acceleration with respect to each axis. Therefore, the calculated tilt can be represented by a vector, and an absolute direction can be detected by acceleration detector without initialization. Further, the value of the calculated tilt is an angle when the gyro-sensor is used, while it is a vector when the acceleration sensor is used. Therefore, when the gyro-sensor is used instead of the acceleration sensor, the tilt data is required to be subjected to predetermined conversion, with a difference between the two devices taken into account. The characteristics of the gyro-sensor, as well as the basic difference between the acceleration detector and the gyro-sensor, are well known to those skilled in the art, and therefore will not be described in further detail herein. The gyro-sensor has an advantage of directly sensing a rotation, while the acceleration sensor generally has an advantage of being more cost-effective than the gyro-sensor when applied to a controller as used in the present embodiment.

The communication section 75 includes the microcomputer 751, a memory 752, the wireless module 753, and the antenna 754. The microcomputer 751 controls the wireless module 753 for wirelessly transmitting transmission data while using the memory 752 as a storage area during the process. Further, the microcomputer 751 controls operations of the sound IC 707 and the vibrator 704, based on data received by the wireless module 753 from the game apparatus 3 via the antenna 754. The sound IC 707 processes sound data and the like transmitted from the game apparatus 3 via the communication section 75. Furthermore, the microcomputer 751 actuates the vibrator 704 based on, for example, vibration data (e.g., a signal for powering the vibrator 704 on/off) transmitted from the game apparatus 3 via the communication section 75.

Data from the controller 7 including an operation signal (key data) from the operation section 72 (when the controller is used to play a game displayed on TV 2), three-axial direction acceleration signals (X-axis, Y-axis and Z-axis direction acceleration data) from the acceleration sensor 701, and the process result data from the imaging information calculation section 74 is outputted to the microcomputer 751. The microcomputer 751 temporarily stores, in the memory 752, the respective data (the key data, the X-axis, Y-axis and Z-axis direction acceleration data, and the process result data) as transmission data to be transmitted to the wireless controller module 19. The wireless transmission from the communication section 75 to the wireless controller module 19 is performed periodically at predetermined time intervals. Since game processing is generally performed in a cycle of 1/60 sec., the wireless transmission is required to be performed in a shorter cycle time. Specifically, the game processing unit is 16.7 ms (1/60 sec.), and the transmission interval of the communication section 75 structured using the Bluetooth (registered trademark) technology is 5 ms. At the transmission timing to the wireless controller module 19, the microcomputer 751 outputs, as a series of operation information to the wireless module 753, the transmission data stored in the memory 752. The wireless module 753 uses, for example, the Bluetooth (registered trademark) technology so as to transmit the operation information as an electric wave signal thereof from the antenna 754 by using a carrier wave of a predetermined frequency. That is, the data from the controller 7 including the key data from the operation section 72, the X-axis, Y-axis and Z-axis direction acceleration data from the acceleration sensor 701, and the process result data from the imaging information calculation section 74 is transmitted from the controller 7. The wireless controller module 19 of the game apparatus 3 receives the electric wave signal, and the game apparatus 3 demodulates or decodes the electric wave signal so as to obtain the series of the operation information (the key data, X-axis, Y-axis and Z-axis direction acceleration data, and the process result data). Based on the obtained operation information and the game program, the CPU 10 of the game apparatus 3 performs the game processing or the motion of the robot 5. Note that in a case where the communication section 75 is structured using the Bluetooth (registered trademark) technology, the communication section 75 can also have a function of receiving transmission data wirelessly transmitted from other devices.

(Overview of the Robot Control System)

Next, an overview of the robot control system will be described.

Figure 9:
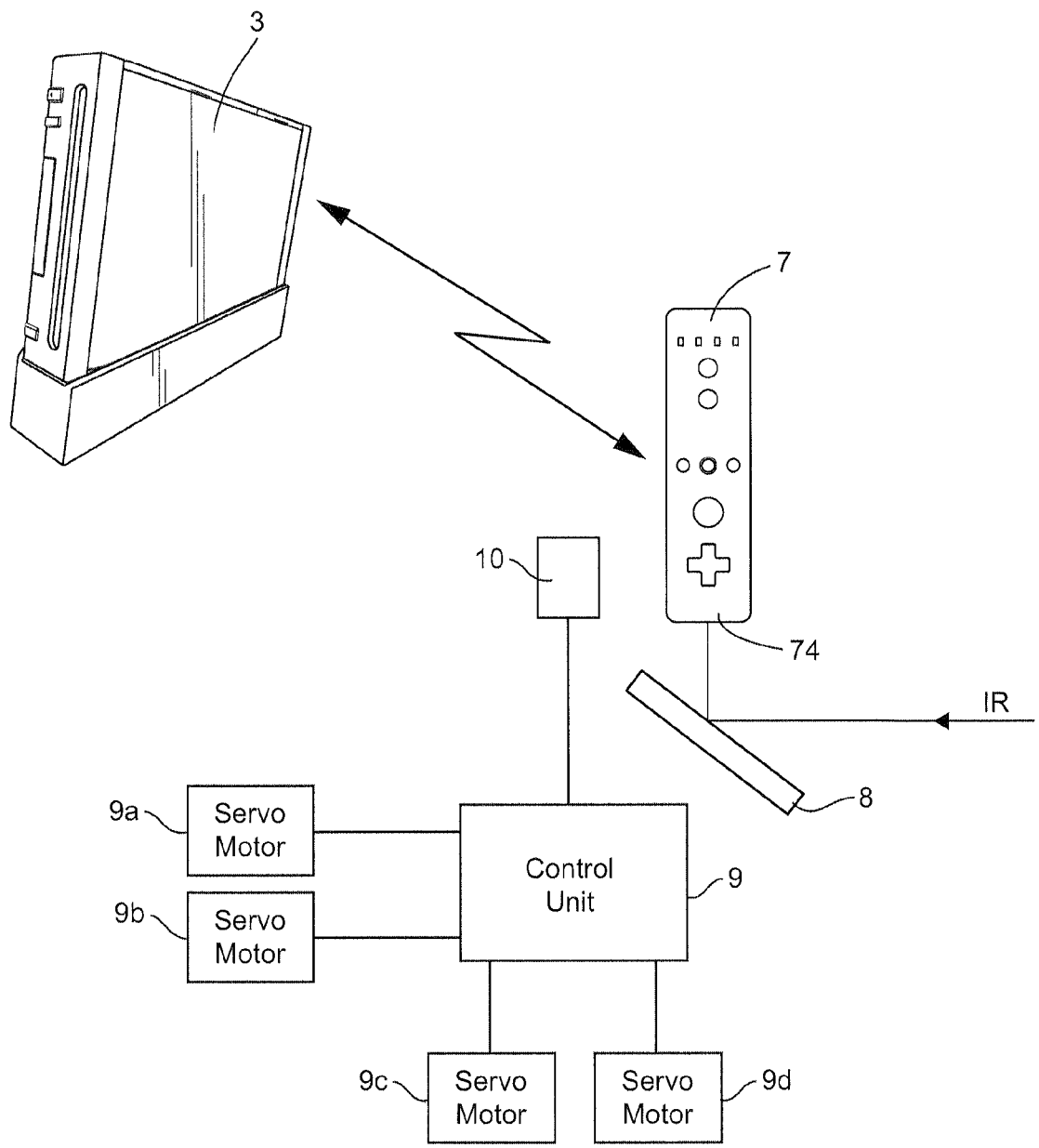
FIG. 9 is a block diagram showing the relationship between the various components of the remote controlled toy control system.

FIG. 9 illustrates the operation principle of the remote controlled robot 5. The controller 7, positioned inside the frame of the robot 5, is used for controlling the movement of the robot 5 (not shown).

First, the IR camera included in the controller 7 is used to detect IR light received from the environment around the robot 5. A rotating mirror 8 intercepts the received radiation and re-directs it towards the IR camera unit 74. The rotating mirror, as will be explained later, is affixed to a base inside the robot 5, the base being in proximity to the controller 7. In another exemplary embodiment, a series of fixed mirrors may be used to construct an optical path for the IR radiation to be received by the IR camera. As discussed above, the IR camera unit 74 includes an infrared filter that allows only infrared light to pass therethrough among light incident on the front surface of the controller 7. Image data generated by the image pickup element 743 of the camera unit 74 is used to locate aspects of the current position of the robot 5 with respect to its surrounding environment, such as obstacles, walls, etc., via wirelessly communicating with the game apparatus 3. The IR radiation may be emitted from different kinds of sources in the environment of the robot 5. For example, the IR radiation may be emitted by the IR markers 6 of the TV 2. However, IR markers may be placed in many other locations in the environment of the robot, such as walls and/or particular obstacles. This arrangement makes possible the reception of the IR radiation by the IR camera of the controller 7 as the robot 5 moves into various locations in the environment which have an obstructed view from the TV 2. The game program in the base unit can then recognize a pattern of received IR radiation to determine certain information related to the surroundings of the robot. Or, as will be discussed later, IR emitters may be placed within the robot 5 in order to emit IR radiation in the vicinity of robot 5, which radiation after being reflected from obstacles near to the robot is detected by the controller 7.

In other words, the example embodiment depicted in FIG. 9 utilizes an existing component of the remote controller 7, the IR camera, which is normally used to detect aspects of the position and the orientation of the controller 7 with respect to the markers 6, and therefore with respect to the TV 2 (when the controller 7 is used to perform game processing executed by the game apparatus 3), as a target acquisition unit for navigating the robot 5, carrying the controller 7, in its environment.

The accelerometer 701 and/or a gyro sensor already existing in the controller 7 can be used to acquire motion information related to the robot 5. As discussed above, these sensors can detect information related to the position, the tilt or a posture of the controller 7, thus they can detect aspects of the motion of robot 5 which carries the controller 7. This accelerometer/gyro information is communicated to the game apparatus 3 which then determines aspects of position, orientation, etc. of the controller 7. Therefore, aspects of the position of the robot can be determined.

In one example embodiment, multiple robots may be interacting with each other and their environment, and controlled by respective multiple players. The accelerometer and/or the gyro information of a controller 7 is related to an aspect of the current position of the robot 5 associated with the controller 7, thus the relative position of the robot 5 with respect to the other mobile robots in a multi-player game environment involving multiple mobile robots, all wirelessly communicating with the game apparatus 3, may be determined. The base unit 3 may be used as a reference point in determining aspects of the position of each of the robots, and establishing the relative position of the various robots with each other.

Next, the audio components existing in the controller 7 may also be used to receive audio feedback from a user in order to control the movement of the robot by controlling the servo motors in the appendages of the robot. The controller 7 includes a sound IC 707 connected to the microcomputer 751 and to speaker 706. A microphone in the game console 3 may be used to pick up an audio command from the user and wirelessly transmit it to the controller 7. An inductive pickup 10 in the robot receives the signal from the speaker 706 and transmits appropriate signals to the four servo motors 9a-9d connected to a control unit 9 of the robot 5 to control the movement of the robot 5.

In another example embodiment, different sound signals may be used to control the robot 5 so that, for example, each of multiple sound signals is respectively associated with a particular operation. In an example, non-limiting implementation, a first sound may be converted into an electrical signal for forward movement of the robot 5. A second sound may be converted into an electrical signal for backward movement. Other sounds may be converted into electrical signals for sideways movement, stopping, etc.

Figure 10:
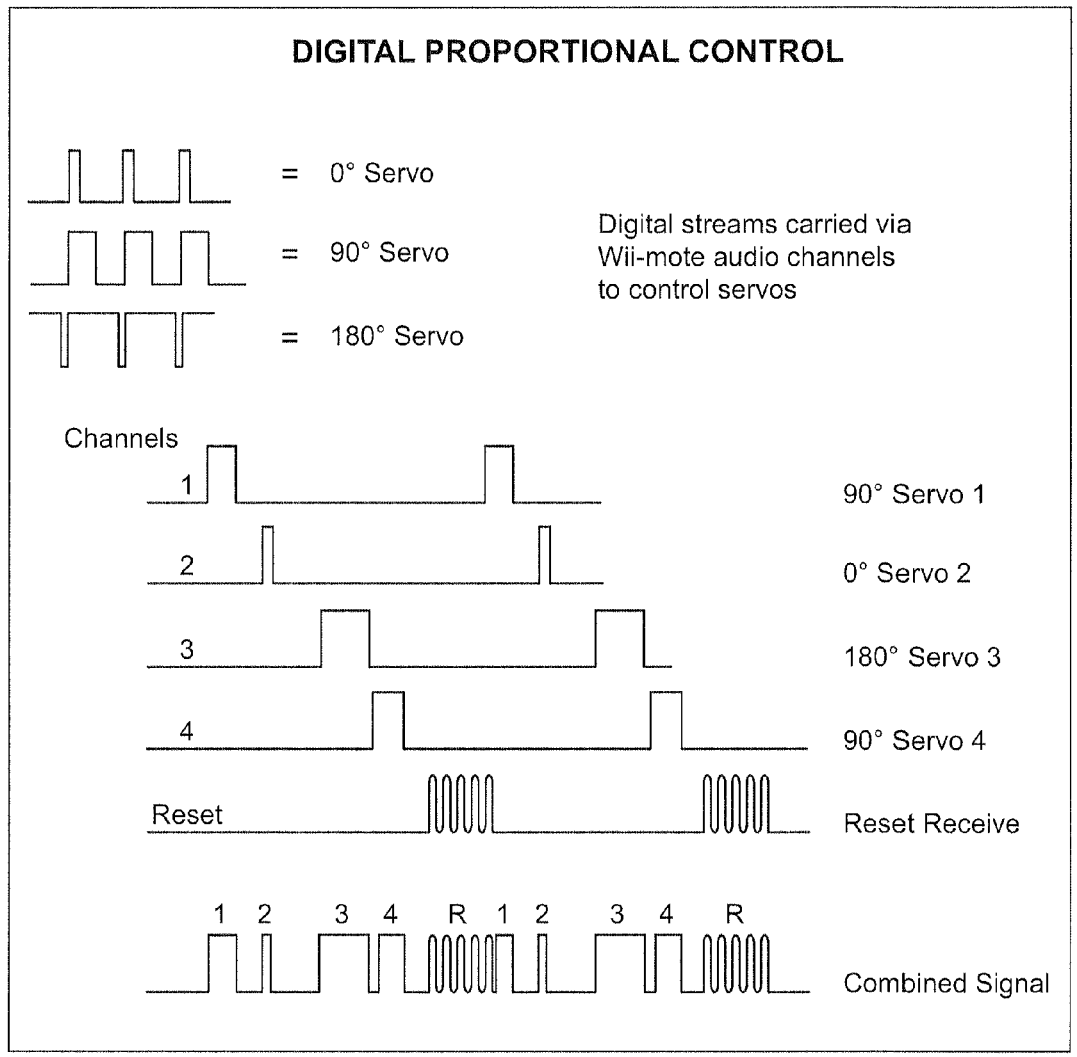
FIG. 10 shows example patterns of signals for controlling the servo motors of the remote controlled toy.

Control of the servo motors can be performed by sending appropriate different control pulsed signals to each servo motor in order to cause motion or rotation, as it is well known in the art. A different modulated 5 KHz signal can be used for each of the servos. An example pattern of different signals is shown in FIG. 10.

In addition to using audio inputs to control the servo motors of the robot, it may be possible to also use other features of the game system for providing control inputs. For example, light inputs may be used, using the LEDs of the remote controller. A transducer may be disposed in the robot to detect light emitted from the light emitters and convert the detected light into electrical signals for various robot controls. Or, vibration inputs may be used, using the vibrator 704 of the remote controller. A transducer may be disposed in the robot to detect the vibratory signals of the controller and convert the detected signals into electrical signals for various robot controls. The above inputs would be provided by the game console 3 in an embodiment where the motion of the robot is affected based on what is happening in a game executed by the game apparatus 3.

(Overview of the Modular Slot)

Figure 11:
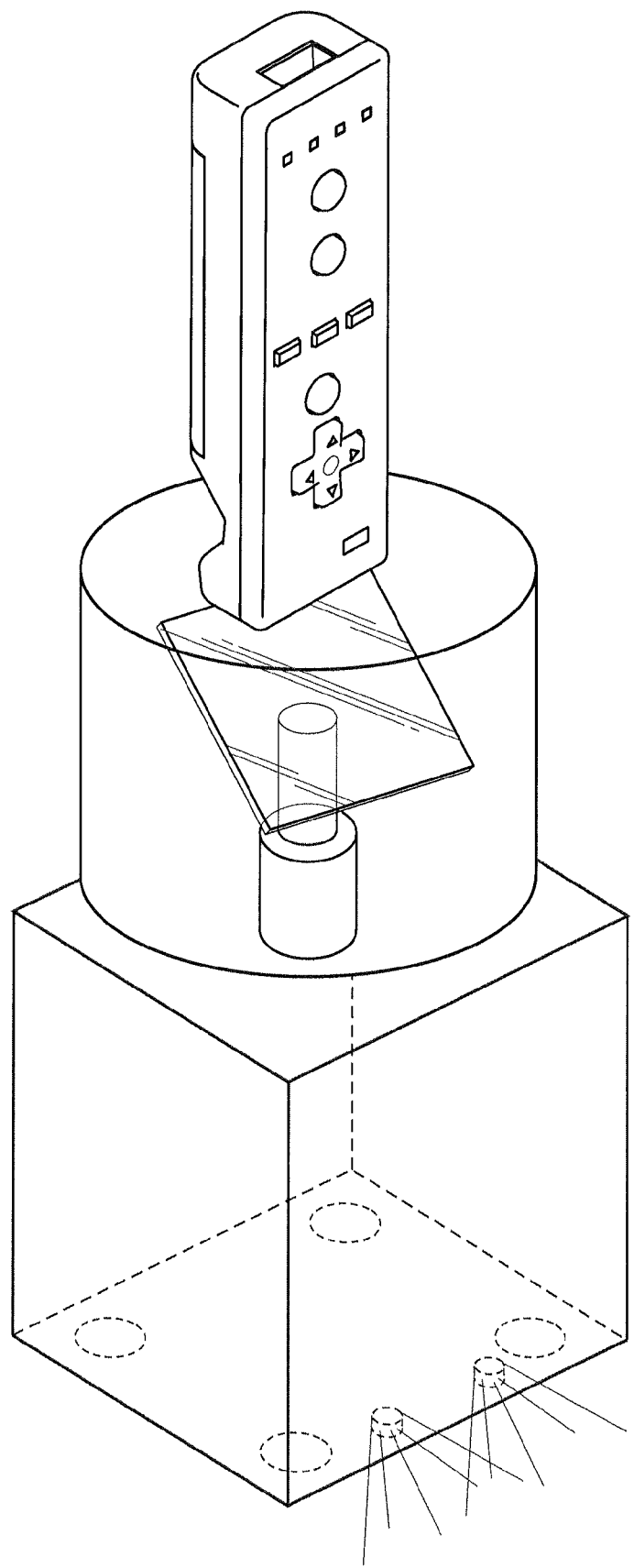
FIG. 11 schematically shows an exemplary arrangement of components located inside the modular slot of the remote controlled toy.

The control system of the example embodiment presented herein is based, for example, on the integration of an existing Wii component, the Wii controller, with the frame of a mobile robot toy. As can be seen in FIG. 11, within a modular slot inside the frame of the robot (not shown), the Wii controller is placed so that its unit 74 (including the image pick up element 743) faces an optical pick-up unit, which includes a 360° rotating mirror. The mirror rotates so that it can intercept IR radiation that is emitted, for example, by IR emitters located in a base unit located beneath the optical pick-up unit, said light reflected from obstacles in the vicinity of the remote controlled toy.

In the above embodiment, the Wii controller includes a wireless transceiver, an accelerometer, a gyro, an IR camera, and an audio channel output. Thus, the Wii controller (which is readily available commercially) provides all the operational features that are needed for performing the control of the remote controlled toy in a very simple way, without the user having to manipulate any extra controllers.

(Applications)

The remote control system of FIG. 2 can be used by a single user to cause the remote controlled device, such as a robot, to interact with its environment. For example, the user can instruct the robot to follow a certain path on a terrain. The robot, by being in constant communication with the game console and via the use of the guidance unit that it is equipped, navigates through the terrain following the user's instructions.

In other example embodiments, multiple remote controlled devices may be communicating with the same game console and being controlled by different users. The various remote controlled devices may correspond to avatar representations of various game characters in a game, such as, for example, Pokemon characters or Mii characters (proprietary Nintendo branded game characters). The various remote controlled devices would interact with each other (for example, fighting each other), following the whims of their users and based on what is happening in the game, doing certain things, thereby providing a real life element in the game. The control system could set specific behaviors or procedures for the remote controlled devices to do certain things and execute the commands. The various remote controlled devices would face-off and see where each other is, and interact with each other based on external interaction between users.

The robot kits disclosed herein could be deployed in the form of Pokemon or other game characters, thus infusing a more interesting nature into established and popular game characters. The feature of the remote control system where it utilizes the game console as a central processing unit, while using a remote controller as the guidance platform, allows for the integration of a mechanical toy with a virtual game environment, at the same time incorporating the user into the operation of the toy.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

The processing system/circuitry described in this specification is "programmed" to control processes such as game processes in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

The invention claimed is:

1. A remotely controlled mobile device control system comprising:
a computer game console;
a mobile device;
a remote controller in wireless communication with the computer game console, the remote controller affixed to the frame of the mobile device; wherein
the remote controller includes a position and motion information acquisition unit configured to obtain and output information related to the current position, orientation and posture of the remote controller, the remote controller further including
a target acquisition unit configured to obtain and output information related to detecting objects in the vicinity of the controller; wherein
the mobile device includes a transducer for receiving an audio input and converting the audio input to modulated control signals inputted to different servo motors of the mobile device, for controlling the motion of different sections of the mobile device, and wherein
the mobile device moves in response to the audio input, and the outputs of the position and motion information acquisition unit and the target acquisition unit.

2. The remotely controlled mobile device control system according to claim 1, wherein
the position and motion information acquisition unit includes at least one accelerometer sensor.

3. The remotely controlled mobile device control system according to claim 2, wherein
the accelerometer sensor comprises a gyro-sensor.

4. The remotely controlled mobile device control system according to claim 1, wherein
the target acquisition unit comprises an infrared camera, including an image pickup element and an infrared filter.

5. The remotely controlled mobile device control system according to claim 4, wherein
the infrared camera receives infrared radiation emitted by at least one infrared emitter positioned in the mobile device, said infrared radiation reflected from an object in the vicinity of the controller and reflected towards the infrared filter via a mirror positioned in the mobile device in the proximity of the infrared camera.

6. The remotely controlled mobile device control system according to claim 5, wherein
the mirror is a 360° rotating mirror, or a series of fixed mirrors.

7. The remotely controlled mobile device control system according to claim 1, wherein
the transducer comprises an inductive pickup, which receives an audio signal from an audio output in the controller, said audio output being generated by a signal transmitted by the game console in response to an audio command of a user, said signal being received by the controller.

8. The remotely controlled mobile device control system according to claim 7, wherein
the inductive pickup produces different pulsed electric signals which are inputted to different servo motors controlling the motion of the different sections of the mobile device.

9. The remotely controlled mobile device control system according to claim 1, wherein
the mobile device comprises a robot toy.

10. The remotely controlled mobile device control system according to claim 9, wherein
the robot toy represents a game character of a game executed by the computer game console.

11. The remotely controlled mobile device control system according to claim 10, wherein
the robot toy representing a game character interacts with other robot toys representing other game characters, using the remotely controlled mobile device control system.

12. The remotely controlled mobile device control system according to claim 1, wherein
the computer game console is a Wii game console and the remote controller is a Wii remote controller.

13. A method for remotely controlling a mobile device having a remote controller, in wireless communication with a computer game console, affixed to the frame of the mobile device, the method comprising:
entering an audio input to a microphone in the computer game console, the audio input being wirelessly transmitted to the remote controller, and converting the received audio signal by the remote controller affixed to the mobile device to modulated control signals inputted to different servo motors of the mobile device, for controlling the motion of different sections of the mobile device, wherein
the remote controller includes position and motion information acquisition elements for obtaining and outputting information related to the current position, orientation and posture of the remote controller, the remote controller further including
target acquisition elements for obtaining and outputting information related to detecting objects in the vicinity of the controller, and
moving the mobile device in response to the audio input, and the outputs of the position and motion information acquisition elements and the target acquisition elements.

14. The method for remotely controlling a mobile device according to claim 13, wherein
the position and motion information acquisition elements include at least one accelerometer sensor.

15. The method for remotely controlling a mobile device according to claim 14, wherein
the accelerometer sensor comprises a gyro-sensor.

16. The method for remotely controlling a mobile device according to claim 13, wherein
the target acquisition elements comprise an infrared camera, including an image pickup element and an infrared filter.

17. The method for remotely controlling a mobile device according to claim 16, wherein
the infrared camera receives infrared radiation emitted by at least one infrared emitter positioned in the mobile device, said infrared radiation reflected from an object in the vicinity of the controller and reflected towards the infrared filter via a mirror positioned in the mobile device in the proximity of the infrared camera.

18. The method for remotely controlling a mobile device according to claim 17, wherein
the mirror is a 360° rotating mirror, or a series of fixed mirrors.

19. The method for remotely controlling a mobile device according to claim 13, wherein
the received audio signal by the remote controller is converted to modulated control signals by a transducer comprising an inductive pickup, which receives an audio signal from an audio output in the controller, said audio output being generated by a signal transmitted by the game console in response to an audio command of a user, said signal being received by the controller.

20. The method for remotely controlling a mobile device according to claim 19, wherein
the inductive pickup produces different pulsed electric signals which are inputted to different servo motors controlling the motion of the different sections of the mobile device.

21. The method for remotely controlling a mobile device according to claim 13, wherein
the mobile device comprises a robot toy.

22. The method for remotely controlling a mobile device according to claim 21, wherein
the robot toy represents a game character of a game executed by the computer game console.

23. The method for remotely controlling a mobile device according to claim 22, wherein
the robot toy representing a game character interacts with other robot toys representing other game characters, using the remotely controlled mobile device control system.

24. The method for remotely controlling a mobile device according to claim 13, wherein
the computer game console is a Wii game console and the remote controller is a Wii remote controller.

25. A robot configured to receive a remote controller in an opening formed therein, the robot comprising:
one or more motors; and
a transducer for receiving an audio input and converting the audio input to modulated control signals inputted to said one or more motors of the robot, for controlling the motion of different sections of the robot, wherein
the remote controller is in wireless communication with a computer game console, wherein
the remote controller includes a position and motion information acquisition unit configured to obtain and output information related to the current position, orientation and posture of the remote controller, the remote controller further including
a target acquisition unit configured to obtain and output information related to detecting objects in the vicinity of the controller, and wherein
the robot moves in response to the audio input, and the outputs of the position and motion information acquisition unit and the target acquisition unit.

* * * * *